Patented Dec. 27, 1938

2,141,458

UNITED STATES PATENT OFFICE 2,141,458

METHOD OF PREPARING COLLOIDAL CARBONATES

Walter C. Bates and Raymond R. McClure, Painesville, Ohio, assignors to Diamond Alkali Company, Painesville, Ohio, a corporation of Delaware No Drawing. Application September 28, 1937, Serial No. 166,114

6 Claims. (Cl. 23—66)

This invention relates to the preparation of colloidal alkaline earth metal carbonates.

The principal object of the invention is to provide a process for the production of such carbonates which can be carried out in substantially neutral solution, which does not require careful temperature regulation and which produces no objectionable co-products such as would require removal by washing or other expensive procedure.

We are aware that prior to our invention colloidal carbonate has been produced according to the reaction:

$$Ca(OH)_2 + CO_2 \rightarrow CaCO_3 + H_2O$$

In making colloidal calcium carbonate according to the above reaction we have found that to obtain a material with maximum colloidal properties, the reaction must be started and artificially maintained at a temperature of 20° C. or lower up to the point of gel formation. As considerable heat is evolved during the reaction, this heat must be absorbed as generated by expensive cooling or refrigeration apparatus. We have found that unless means are provided to prevent a temperature rise during the reaction up to the point of gel formation, a calcium carbonate of a lower proportion of colloidal properties will be produced, the amount of colloidal material varying inversely as the rise in temperature, until at about 50° C., or above, practically no colloidal properties are present in the material. We have tested calcium carbonates prepared by this process, in a complete range of temperatures from 10° C. to 60° C., and have found colloidal material in varying degree, as evidenced by stable suspension in water, adsorption of dyes, ultramicroscopic photographs of dispersed samples, and other well known means of identifying colloids.

We are aware also that colloidal carbonate has been produced according to a second reaction as follows:

$$CaCl_2 + (Na_2CO_3 + NaOH) \rightarrow CaCO_3 + 2NaCl + NaOH$$

This second reaction requires the presence of alkali metal hydroxide throughout the reaction mixture, which must later be removed by expensive procedure, and which, practically, cannot be entirely removed.

In our work with this second reaction, we have found that the proportion of colloidal material in the calcium carbonate so produced was lower than that which could be obtained by other methods. In fact, we have found that a reduction of colloidal properties resulted if one portion of a sample of good material was treated with a dilute solution of sodium hydroxide, as compared with the original sample.

We have discovered that by carrying out the following reactions:

$$Ca(OH)_2 + CO_2 \rightarrow CaCO_3 + H_2O$$
$$CaCl_2 + Na_2CO_3 \rightarrow CaCO_3 + 2NaCl$$

at the same time in the same reaction mixture, we are able to avoid the need for low temperature and also the need for the presence of alkali or high pH value. Other soluble alkaline earth metal salts may be substituted for $CaCl_2$ and other alkali metal carbonates for $Na_2CO_3$. Disregarding impurities, we have no insoluble material in the reaction mixture at the end of the reaction except the desired colloidal carbonate and no soluble substances which are difficult to remove from the colloidal carbonate nor any which may not be left in small amounts without substantial injury to the product.

The reaction for our process, for purposes of illustration, may be written:

$$8.0CaCl_2 + 7.2Na_2CO_3 + .8Ca(OH)_2 + .8CO_2 \rightarrow$$
$$8CaCO_3 + 14.4NaCl + .8H_2O + .8CaCl_2$$

It will be noted that calcium chloride is present in excess of the stoichiometric proportion with respect to sodium carbonate. This is essential although the excess need not be as great as indicated. At 10 mols percent excess on the basis of $CaCO_3$ produced from all reactants, we have obtained uniformly good results. With very small excesses the results are uncertain. This excess $CaCl_2$ prevents the formation of NaOH in the reaction mixture, since highly soluble sodium hydroxide cannot exist even in small amounts in the presence of excess calcium chloride, as the more insoluble calcium hydroxide will be formed immediately under these conditions. We determine the quantity of excess calcium chloride that is sufficient to give the desired results by test of the clear filtrate with a calcium chloride solution. When addition of calcium chloride solution to the clear filtrate will not precipitate further calcium carbonate, we have found that the excess calcium chloride used in the process is sufficient to give the desired colloidal carbonate.

We have found also that $CO_2$ must be present in excess of the stoichiometric proportion with respect to $Ca(OH)_2$. Since the $Ca(OH)_2$ is present in the form of milk of lime (a suspension) and the other reactants are in solution except $CO_2$ which is supplied in gas form and disseminated by agitation, it is convenient and, as a practical matter, necessary to employ a substantial excess thereof.

Maintaining the necessary proportions as above indicated, we have been able to use successfully as little calcium hydroxide as 2.5 mols percent with respect to the total calcium carbonate produced and as much as 25 mols percent thereof. Below 2.5 mols percent the results are non-uniform and the product is inferior; above 25 mols percent the results become unsatisfactory unless means are provided for absorbing the excess heat evolved during the reaction. These values are not sharply critical but represent practical limits which may not be departed from greatly without unsatisfactory results.

Example

As an example of our process, using calcium hydroxide in sufficient quantity to provide 10% of the total calcium required to precipitate the calcium carbonate, and 10% excess calcium chloride on the basis of the total calcium carbonate precipitated, we prepared two water solutions: One solution consisted of 8237 cc. which contained a suspension of 59 grams of calcium hydroxide and 888 grams of calcium chloride (an equivalent quantity of distiller waste from ammonia soda process may be used). The other solution consisted of 3816 cc. containing 763.2 grams of sodium carbonate. These two solutions were fed simultaneously at room temperature into the mixing chamber to a high speed agitation machine, into which was being pumped at the same time, 60 to 70 grams of pure carbon dioxide gas. (Its equivalent in a mixture of air and carbon dioxide may be used.) The rate of flow into the mixing chamber of the agitator was such that the quantities specified were all introduced during the same period of time. As a result of the reaction, the effluent from the mixing chamber was composed of a slurry of calcium carbonate of milky white color and creamy consistency having a substantially neutral reaction. The sodium chloride and the calcium chloride components were removed by filtering and washing with water, and the filter cake, which was practically free from impurities, was dried and disintegrated to a granular powder.

Colloidal barium carbonate and colloidal strontium carbonate have been prepared in the same manner, the term alkaline earth when used in the claims is intended to include calcium, barium and strontium only.

From the foregoing it will be obvious that we have provided a process well suited for preparation of alkaline earth metal colloidal carbonates and realizing the objects stated above. While we have described the present preferred embodiments of the invention, we wish it understood that we are not limited to the details of the disclosure but only in accordance with the appended claims.

Having thus described our invention, what we claim is:

1. A method of preparing colloidal alkaline earth metal carbonates comprising treating a slurry containing a soluble alkaline earth metal salt other than a carbonate or hydroxide and an alkaline earth metal hydroxide by simultaneous additions thereto, with agitation, of an alkali metal carbonate and carbon dioxide gas, said soluble alkaline earth metal salt being supplied in excess of the theoretical quantity required to react with said alkali metal carbonate and being soluble in water at least to the extent of 1 part in 200 at 30° C. and said carbon dioxide gas being supplied in excess of the theoretical quantity required to react with said alkaline earth metal hydroxide.

2. In the process recited in claim 1, said alkaline earth metal hydroxide being present in said slurry to the extent of from 2.5 to 25 mols percent of the total carbonate material produced.

3. A method of preparing colloidal calcium carbonate comprising treating a slurry containing a soluble calcium salt and calcium hydroxide by simultaneous addition thereto, with agitation, of an alkali metal carbonate and carbon dioxide gas, said soluble calcium salt being supplied in excess of the theoretical quantity required to react with said alkali metal carbonate and said carbon dioxide gas being supplied in excess of the theoretical quantity required to react with said calcium hydroxide, said excess of soluble calcium salt being not substantially less than 10 mols percent.

4. A method of preparing colloidal calcium carbonate comprising treating a slurry containing $CaCl_2$ and $Ca(OH)_2$ by simultaneous addition thereto of $Na_2CO_3$ and $CO_2$, the proportions, molal basis, being so regulated that $CaCl_2$ is in excess with respect to $Na_2CO_3$, $CO_2$ is in excess with respect to $Ca(OH)_2$, and $CaCl_2$ is present in greater quantity than $Ca(OH)_2$.

5. A method of preparing colloidal calcium carbonate comprising treating a slurry containing $CaCl_2$ and $Ca(OH)_2$ by simultaneous addition thereto of $Na_2CO_3$ and $CO_2$, the proportions, molal basis, being so regulated that $CaCl_2$ is in excess with respect to $Na_2CO_3$, $CO_2$ is in excess with respect to $Ca(OH)_2$, and $CaCl_2$ is present in greater quantity than $Ca(OH)_2$, the excess of $CaCl_2$ being such that upon addition of $CaCl_2$ to the clear filtrate from the reaction mixture no precipitate of $CaCO_3$ is produced.

6. In the combination recited in claim 5, the proportion of $Ca(OH)_2$ with respect to $CaCl_2$ being from 2.5 to 25 mols percent.

WALTER C. BATES.
RAYMOND R. McCLURE.